United States Patent
Daly et al.

(10) Patent No.: US 7,177,730 B2
(45) Date of Patent: Feb. 13, 2007

(54) INSTALLATION KIT FOR AFTER-MARKET AUTOSOUND HEAD UNIT WITH HVAC CONTROL EMULATION

(75) Inventors: Charles David Daly, Somerville, NJ (US); R Spencer Quilling, II, Glenwood, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 10/980,177

(22) Filed: Nov. 4, 2004

(65) Prior Publication Data
US 2006/0095166 A1    May 4, 2006

(51) Int. Cl.
G06F 13/00   (2006.01)
G09G 5/00   (2006.01)

(52) U.S. Cl. ............................. 701/1; 307/9.1; 361/814
(58) Field of Classification Search ................... 701/1, 701/33, 29; 307/9.1, 10.1; 340/825.25, 340/815.4, 439, 461, 825.22, 815.41, 825.06, 340/825.14; 361/814, 686, 724
See application file for complete search history.

(56) References Cited

U.S. PATENT DOCUMENTS

| | | | |
|---|---|---|---|
| 4,895,326 A * | 1/1990 | Nimpoeno et al. | 248/27.1 |
| 5,106,039 A | 4/1992 | Gross | 248/27.1 |
| 5,467,947 A | 11/1995 | Quilling, II | 248/27.1 |
| D401,591 S | 11/1998 | Jones, Jr. | D14/224 |
| 5,895,016 A * | 4/1999 | Blackburn | 248/27.1 |
| D418,838 S | 1/2000 | Jones, Jr. | D14/224 |
| 6,202,008 B1 * | 3/2001 | Beckert et al. | 701/33 |
| D481,378 S | 10/2003 | Quilling, II et al. | D14/224 |
| D481,707 S | 11/2003 | Quilling, II et al. | D14/224 |
| D482,023 S | 11/2003 | Quilling, II et al. | D14/224 |
| D482,024 S | 11/2003 | Quilling, II et al. | D14/224 |
| D483,027 S | 12/2003 | Quilling, II et al. | D14/224 |
| D484,495 S | 12/2003 | Quilling, II et al. | D14/224 |
| D485,260 S | 1/2004 | Quilling, II et al. | D14/224 |
| D488,462 S | 4/2004 | Quilling, II et al. | D14/224 |
| D492,287 S | 6/2004 | Quilling, II | D14/224 |
| D492,288 S | 6/2004 | Quilling, II | D14/224 |
| D492,668 S | 7/2004 | Quilling, II | D14/224 |
| D496,028 S | 9/2004 | Quilling, II | D14/224 |
| D496,354 S | 9/2004 | Quilling, II | D14/224 |
| D501,852 S | 2/2005 | Quilling, II | D14/224 |
| 7,007,118 B2 * | 2/2006 | Shu et al. | 710/72 |
| 2004/0119683 A1 * | 6/2004 | Wam et al. | 345/156 |

OTHER PUBLICATIONS

Metra 2001 Autosound Installation Products Catalog, pp. Cover, 1-62, Published May 2001.
Metra 2002 Autosound Installation Products Catalog, Cover, pp. 6-64, Published Oct. 2002.

* cited by examiner

*Primary Examiner*—Dalena Tran
(74) *Attorney, Agent, or Firm*—John Wiley Horton (57) ABSTRACT

An installation kit for adapting a vehicle for installation of an after-market autosound head units includes a panel having a standard-sized receptacle for receiving the aftermarket stereo. A user interface is provided on the front surface of the panel, by which a user can operate a climate control system of the vehicle. A controller is disposed at a back surface of the panel and is adapted to control the climate control system in accordance with user input to the user interface.

20 Claims, 7 Drawing Sheets

INSTALLATION KIT FOR AFTER-MARKET AUTOSOUND HEAD UNIT WITH HVAC CONTROL EMULATION

FIELD OF THE INVENTION

The invention relates generally to installation kits that allow aftermarket autosound head units, such as single DIN sized stereo radios, to be installed in vehicles. More specifically, the installation kits of the invention allow aftermarket autosound head units to be installed in vehicles having an OEM radio that shares a display or mounting component with a climate control system of the vehicle.

BACKGROUND OF THE INVENTION

Most cars today come with an am/fm radio tuner, cassette deck, and/or compact disk (CD) player, as standard equipment. Numerous other types of after-market car audio and video equipment are also available today, such as digital media players (e.g., mp3 players, DVD players, minidisk players), CD changers, satellite radio tuners, navigation systems, computers, and the like. The term "autosound head unit" is used broadly herein to refer to electronic devices capable of displaying audio and/or video media, and includes, without limitation each of the foregoing components either individually or in combination. As more and different autosound head unit components become available, people want the flexibility to customize and/or upgrade their existing audio equipment to take advantage of the new innovations in car audio equipment.

To a great extent, this desired flexibility is limited by the fact that many new vehicles have an OEM autosound head unit integrated with one or more other systems of the vehicle. This makes it impossible for a user to remove the factory stereo radio without losing the functionality of the other integrated system(s). For example, some vehicles combine the radio display with the display of the climate control system, navigation system, or the like.

Another factor that makes it difficult to simply replace a factory radio with an after-market autosound head unit is that the factory autosound head units of many vehicles are not of a standard shape and/or size and are integrated into a single dashboard component.

For these and other reasons, there remains a need in the art for installation kits that allow aftermarket autosound head units to be installed in vehicles, while retaining the functionality of other systems and original dashboard components of the vehicle.

SUMMARY OF THE INVENTION

Our invention relates to an installation kit that remedies the foregoing and other deficiencies in the prior art.

Our invention allows for the installation of an aftermarket autosound head unit in vehicles that share a display with other components and/or systems of the vehicle, such as heating, ventilation, and air conditioning (HVAC) controls (referred to collectively as "climate controls" or "climate control system"). Additionally, my invention allows for the installation of an afte-rmarket autosound head unit in vehicles having factory autosound head units of nonstandard shape and/or size. To accomplish these and other advantages, the installation kit of my invention replaces a portion of the dashboard with a panel having new climate controls and a standard sized receptacle (such as a single DIN, 1.5 DIN, or double DIN receptacle) for mounting of any DIN or ISO DIN after-market autosound head unit.

According to one aspect, our invention relates to an installation kit for adapting a vehicle for installation of an aftermarket stereo. The kit comprises a panel having a front surface, a back surface, and a standard-sized receptacle for receiving the aftermarket stereo. A user interface is provided on the front surface of the panel, by which a user can operate a climate control system of the vehicle. A controller is disposed at a back surface of the panel and is adapted to control the climate control system in accordance with user input to the user interface.

In one preferred aspect, the user interface comprises a fan speed selection interface by which the user can set a desired fan speed of the climate control system, and a temperature selection interface by which the user can set a desired temperature of the climate control system.

In another preferred aspect, the user interface comprises a mode selection interface by which a user can select where in the vehicle to direct air from the climate control system. Preferably, the mode selection interface comprises a plurality of buttons, each representing at least one zone of the vehicle, such that by selecting one of the plurality of buttons the user can cause air to be directed to the at least one zone corresponding to the selected button.

In yet another preferred aspect, the user interface comprises an air conditioning selector by which a user can activate an air conditioning portion of the climate control system of the vehicle.

In yet another preferred aspect, the user interface comprises an air recirculation/fresh selector by which a user can select whether outside air is used as an air source of the climate control system.

In yet another preferred aspect, the user interface comprises a rear window defrost selector by which a user can activate a rear window defroster of the vehicle.

In yet another preferred aspect, the installation kit further comprises at least one visible indicator associated with each of the mode selection interface, the air conditioning selector, the air recirculation/fresh selector, and the rear window defrost selector, that visibly indicates a current state of the climate control system. Preferably, each visible indicator comprises a light emitting diode.

In still another preferred aspect, the controller comprises a microprocessor adapted to control a blower fan, a mode selection motor, an air temperature mix motor, a recirculate air / fresh air motor, an air conditioner compressor, and a rear defroster, in response to operation by the user of the mode selection interface, the air conditioning selector, the air recirculation/fresh selector, and the rear window defrost selector, respectively.

A better understanding of these and other features and advantages of the invention may be had by reference to the drawings and to the accompanying description, in which preferred embodiments of the invention are illustrated and described.

BRIEF DESCRIPTION OF THE DRAWINGS

Throughout the figures, like or corresponding reference numerals have been used for like or corresponding parts.

DESCRIPTION OF THE PREFERRED EMBODIMENTS

As shown in FIGS. 1–6, the installation kit 10 of our invention comprises a panel 12 having a standard-sized receptacle 40, preferably a single-DIN receptacle, for receiving an after-market autosound head unit. Of course, other size receptacles could alternatively be used. The preferred embodiment illustrated is configured for use in a Honda Accord automobile, model years 2003 and 2004. An outer periphery of the receptacle 40 is preferably defined by a bezel 50, which engages the panel 12 and fills a gap between the exterior of the aftermarket stereo and the panel 12. A user interface 14, 16, 18, and 20 is provided on the front surface of the panel 12, by which a user can operate a factory system of the vehicle, such as a climate control system of the vehicle. A controller 100 is disposed at a back surface of the panel 12 (not visible in FIGS. 1–6, but depicted schematically in FIG. 7) and is adapted to control the climate control system of the vehicle in accordance with input to the user interface 14, 16, 18, and 20.

Figure 1:
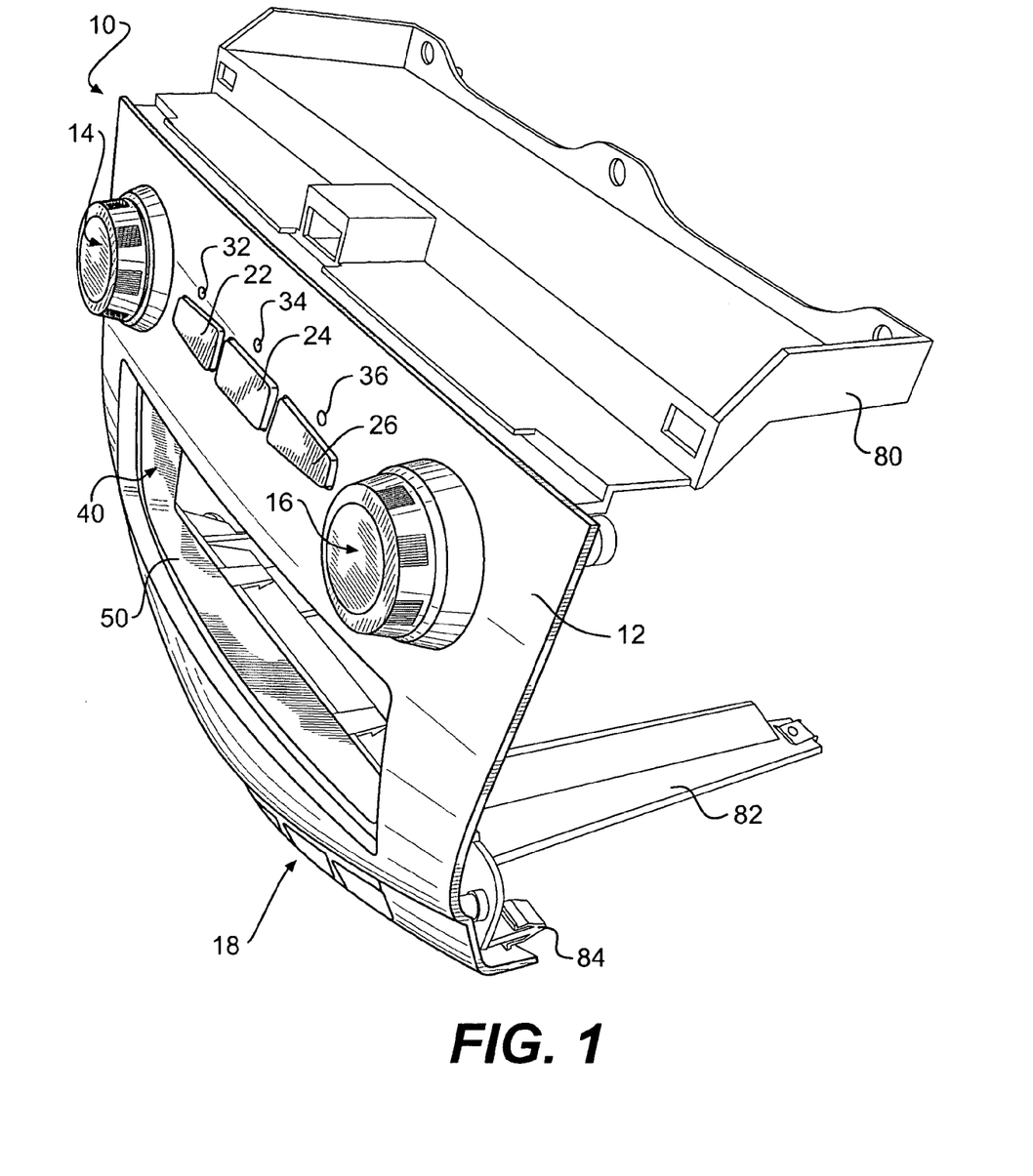
FIG. 1 is a perspective view of an installation kit according to a preferred embodiment of our invention.
Figure 2:
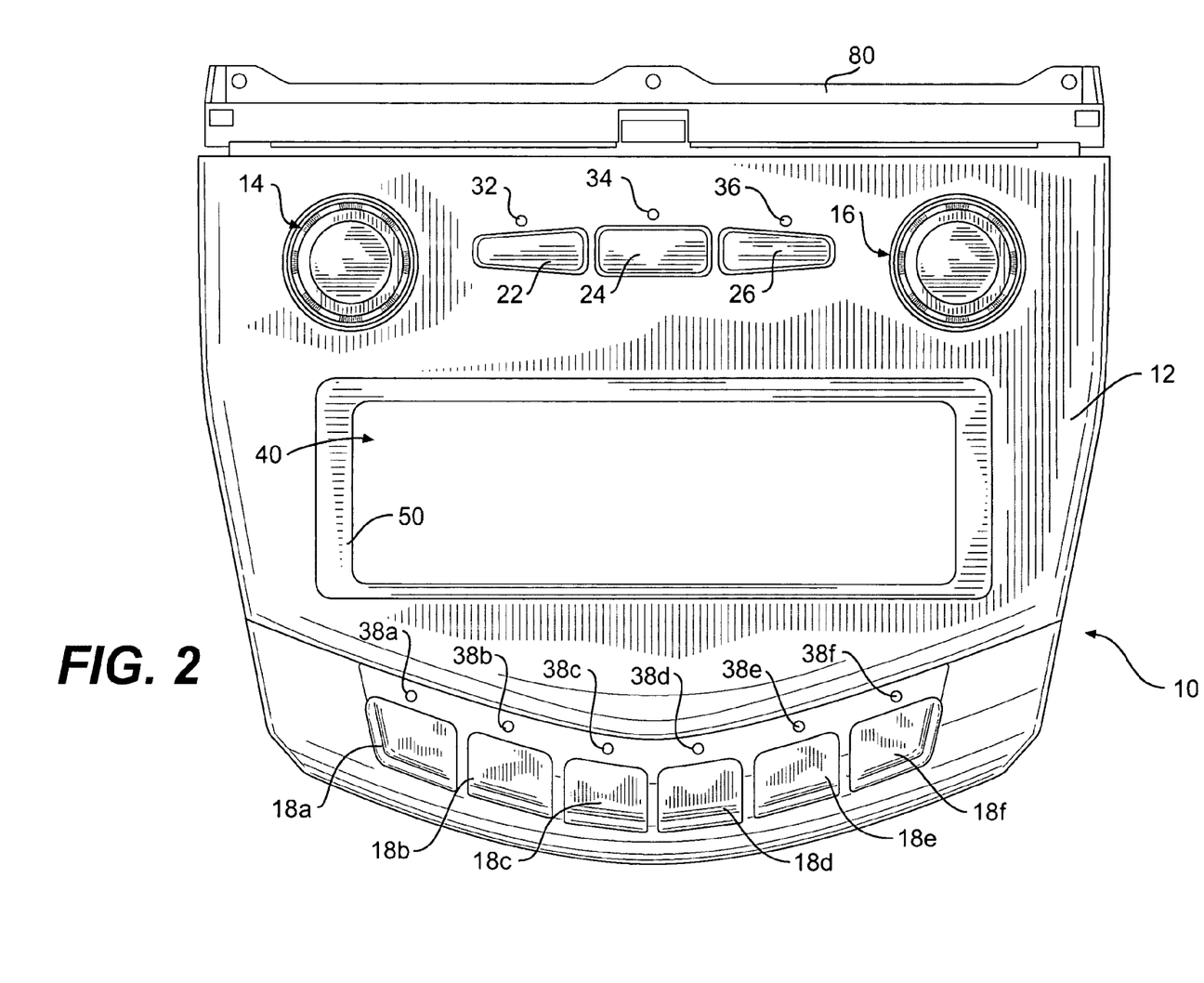
FIG. 2 is a front view of the installation kit shown in FIG. 1.

The user interface 14, 16, 18, and 20 comprises various climate controls of the vehicle, including a fan speed selection interface 14, a temperature selection interface 16, a mode selection interface 18, an air conditioning selector 22, a recirculation/fresh selector 24, and a rear window defrost selector 24. Using the user interface a user can adjust the climate control system of the vehicle.

Figure 7:
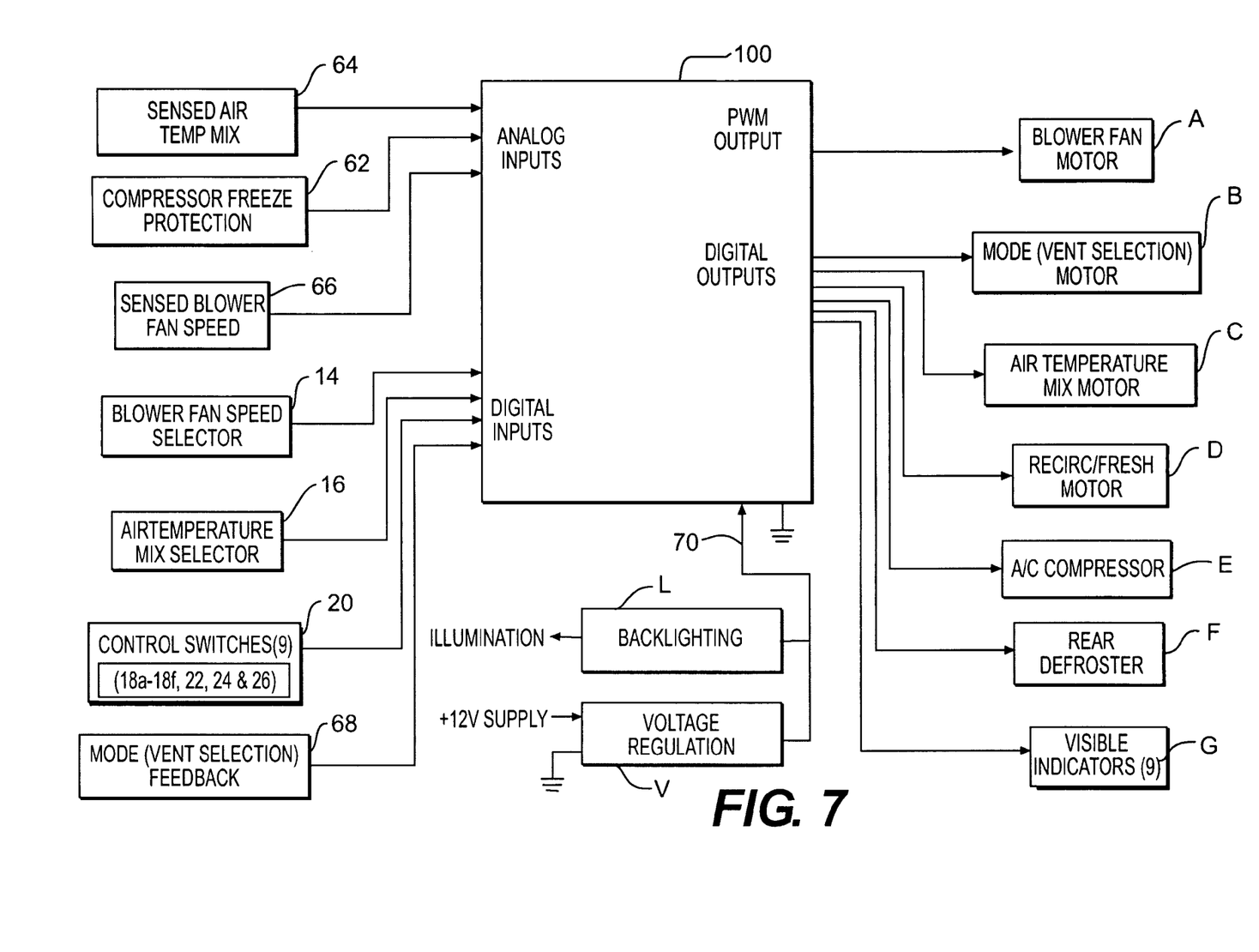
FIG. 7 is a schematic drawing of the internal components of the installation kit shown in FIG. 1.

Referring now to FIG. 7, the climate controls input by the user are implemented by the controller 100, which preferably comprises a microcontroller, more preferably a Microchip PIC16F874A microcontroller. The controller 100 is preferably mounted to a printed circuit board (PCB) for communication with the other electronic components of the installation kit and the climate control system of the vehicle. The controller 100 controls a blower fan motor A, a mode selection motor B, an air temperature mix motor C, a recirculate/fresh motor D, an air conditioner compressor E, and a rear window defroster F of the vehicle, as well as several visible indicators G of the installation kit. Climate control interfaces 14, 16, and 18a–18f, and selectors 22, 24, and 26, are collectively schematically represented in FIG. 7 by control switches 20.

The blower fan speed can be set using the fan speed interface 14 on the panel 12. The fan speed interface 14 controls a 4 bit gray-code encoder, which is read by the controller 100 through a parallel-in serial-out shift register. The controller 100 reads the 4-bit code, converts it to standard 4-bit binary, and drives the blower fan motor A of the vehicle at an appropriate speed. The blower fan motor current is fed back as an analog input to an analog to digital converter (not shown) of the controller 100. The feedback current corresponds to a sensed blower fan speed signal 66, and is used to regulate the speed of the blower fan motor A. The blower fan motor A is driven by a filtered and buffered, pulse width modulated (PWM) output from the controller 100.

The mode selection interface 18 is used to select where in the vehicle to direct air from the climate control system, and comprises a plurality of buttons 18a–18f, each representing at least one zone of the vehicle, ranging from the front defrost vents to the "face" vents to the floor vents. Each zone is associated with one or more vents of the vehicle. The mode selection motor B opens and closes ducts to direct air to the various vents of the climate control system in response to input to the mode selection interface 18 by the user. The current mode is fed back to the controller 100 with 4-bit signals from the vehicle, again Gray encoded. In order to change modes, the controller 100 drives the reversible mode selection motor B in the appropriate direction until the desired mode is achieved. The mode selection motor B is, preferably, driven by one half of an ST293D integrated circuit, which is controlled by the controller 100. By selecting one of the mode selection buttons 18a–18f, the user can cause air to be directed to the vent(s) associated with the zone or zones corresponding to the selected button.

The air temperature mix interface 16 allows a user to adjust the temperature of the air coming out of the vehicle vents. User input from the air temperature mix interface 16 is fed to the controller 100 through an encoder similar to the blower fan speed encoder described above. The controller 100 directs an ST293D integrated circuit to drive the air temperature mix motor C to adjust the temperature of the air coming out of the vents. To accomplish this, a sensed air temperature mix signal 64 is generated by an analog potentiometer and is fed back to the controller 100. The controller 100 controls the air temperature mix motor C based on whether the temperature selected by the user on the air temperature mix interface 16 is hotter or colder than the sensed air temperature.

The recirculate/fresh selector 24 allows a user to select whether recirculated air or fresh (i.e., outside) air is used as the air source of the climate control system. User input from the recirculate/fresh selector 24 is fed directly to the controller as a digital signal. The controller 100 drives the recirculate/fresh motor D to open or close a fresh air duct in response to operation of the recirculate/fresh selector 24 by the user. The recirculate/fresh motor D is driven in one direction for 10 seconds to achieve recirculate mode, and driven in the opposite direction for 10 seconds to achieve fresh mode.

The air conditioning selector 22 allows the user to activate or deactivate the air conditioning compressor E of the vehicle. User input from the air conditioning selector 22 is fed directly to the controller as a digital signal. The controller 100 activates or deactivates the air conditioning compressor E of the vehicle in response to operation of the air conditioning selector 22 by the user. In operation, the controller 100 measures the temperature of the evaporator coil by measuring the resistance of a thermistor on the coil. A compressor freeze protection signal 62, corresponding to this evaporator coil temperature, is fed back to the analog digital converter of the controller 100. If the evaporator coil is above freezing and the air conditioning selector 22 is actuated, the output signal activates a relay to apply power, for example, to a conventional air conditioning compressor clutch, to engage the air conditioning compressor E.

The rear window defrost selector 26 allows the user to activate or deactivate rear window defroster F of the vehicle. Generally, the rear window defroster F comprises as a rear windshield heater, such as a resistance heater. When the rear window defroster selector 26 is activated, the controller 100 drives an external relay coil to activate the rear window defroster F. Preferably, the rear window defroster F is left on until the user shuts it off, or until the car is shut off. Alternatively, the rear window defroster F may shut off automatically after a predetermined period of time has elapsed.

The mode selection buttons 18a–18f, the air conditioning selector 22, the recirculate/fresh selector 24, and the rear window defroster selector 26 are provided with visible indicators 38a–38f, 32, 34, and 36, respectively (collectively represented in FIG. 7 by reference character G) that visibly indicate a current state of the climate control system. For example, the air conditioning selector visible indicator 32 indicates whether the air compressor E is activated or not, the mode selection indicators 38a–38f indicate which one of the plurality of modes is selected, etc. Preferably, the visible indicators G comprise light emitting diodes LEDs. The LEDs may be all of the same color or of different colors, and may or may not be dimmable with the instrument panel of the vehicle.

Figure 3:
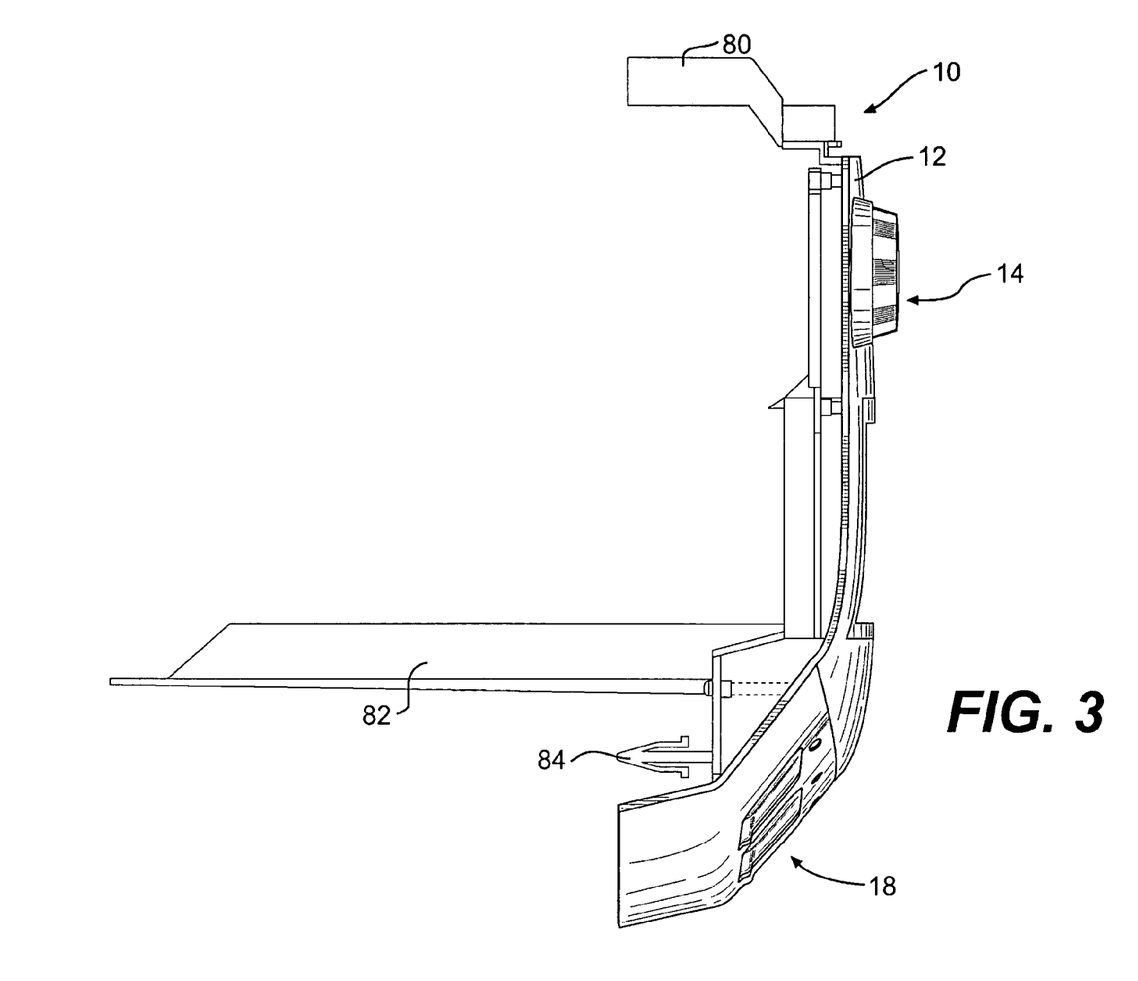
FIG. 3 is a side view of the installation kit shown in FIG. 1.
Figure 4:
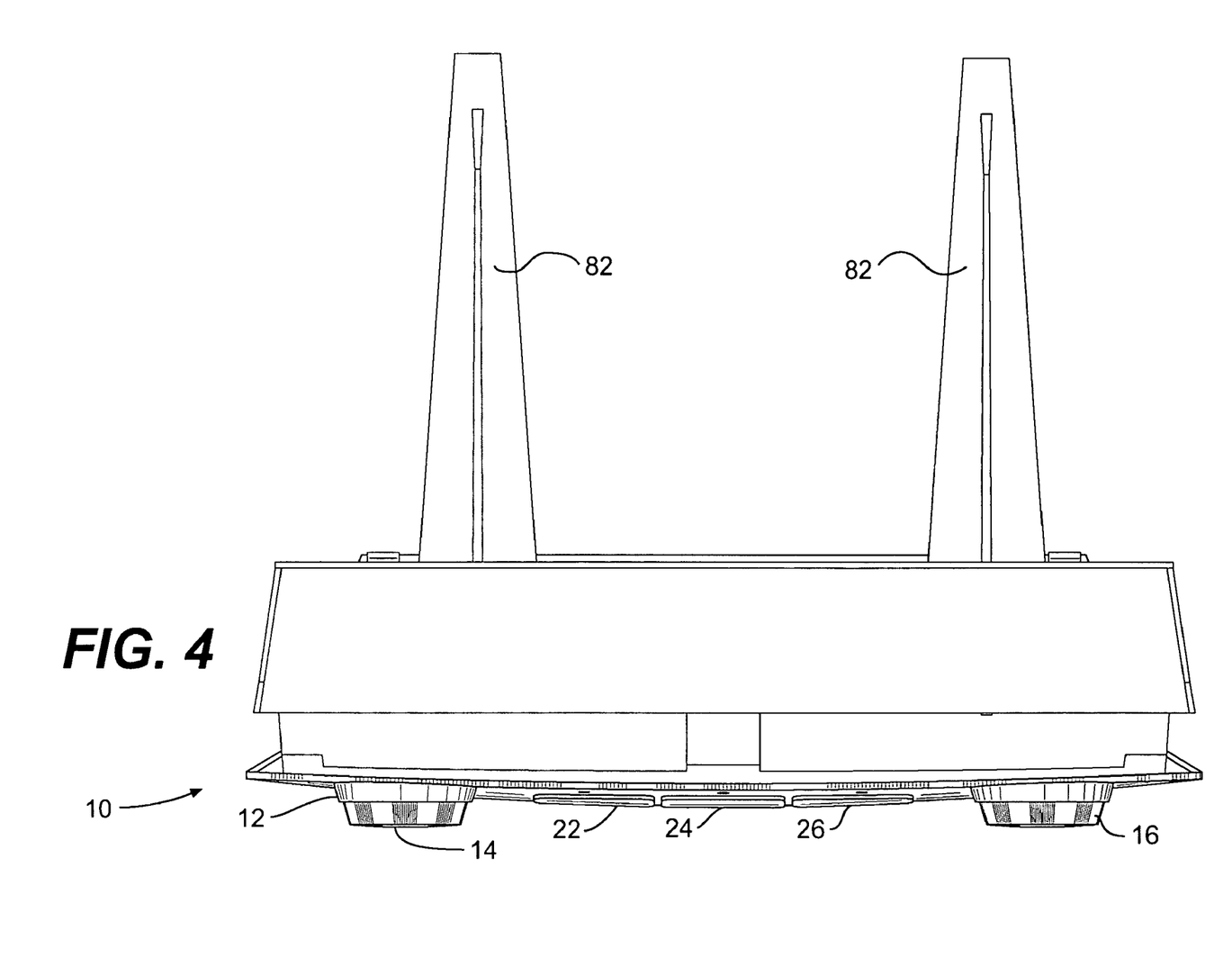
FIG. 4 is a top view of the installation kit shown in FIG. 1.
Figure 5:
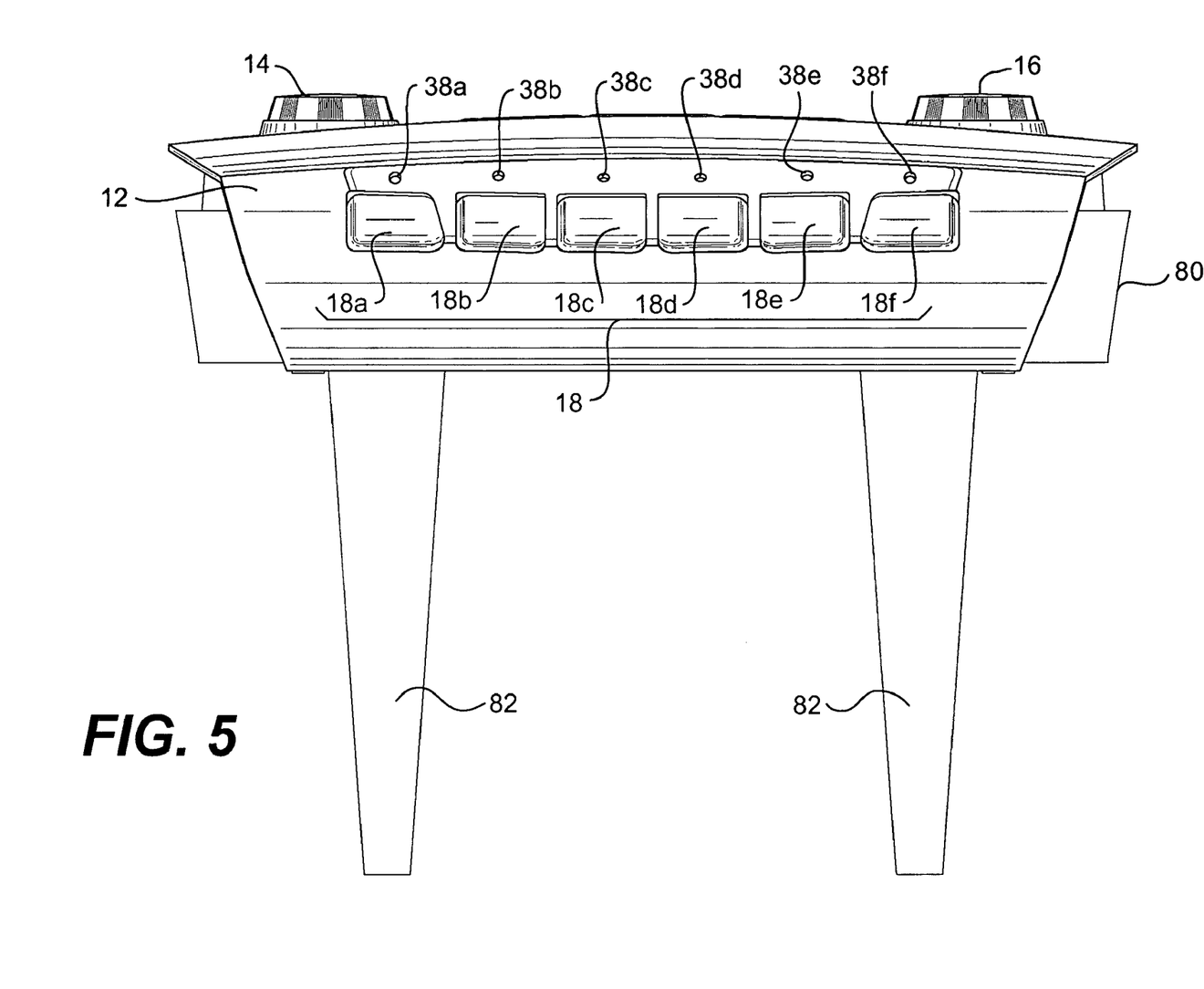
FIG. 5 is a bottom view of the installation kit shown in FIG. 1.

As best seen in FIGS. 1 and 3, the panel 12 is preferably mounted within the dash of the vehicle by an upper mounting plate 80, two lower mounting bosses 82, and a pair of attachment tabs 84. Of course, numerous other attachment methods that are known to those skilled in the art could be used, depending on, among other things, the size, shape, and design of the vehicle into which the installation kit is to be installed. Preferably, the installation kit is designed to match and blend unobtrusively into the surrounding interior and/or dashboard of the vehicle.

Preferably, the panel 12, bezel 50, mounting plate 80, mounting bosses 82, and various interfaces are made of injection molded acrylonitrile butadiene styrene (ABS). Of course, other materials and manufacturing processes may also be used and are known to those skilled in the art.

Figure 6:
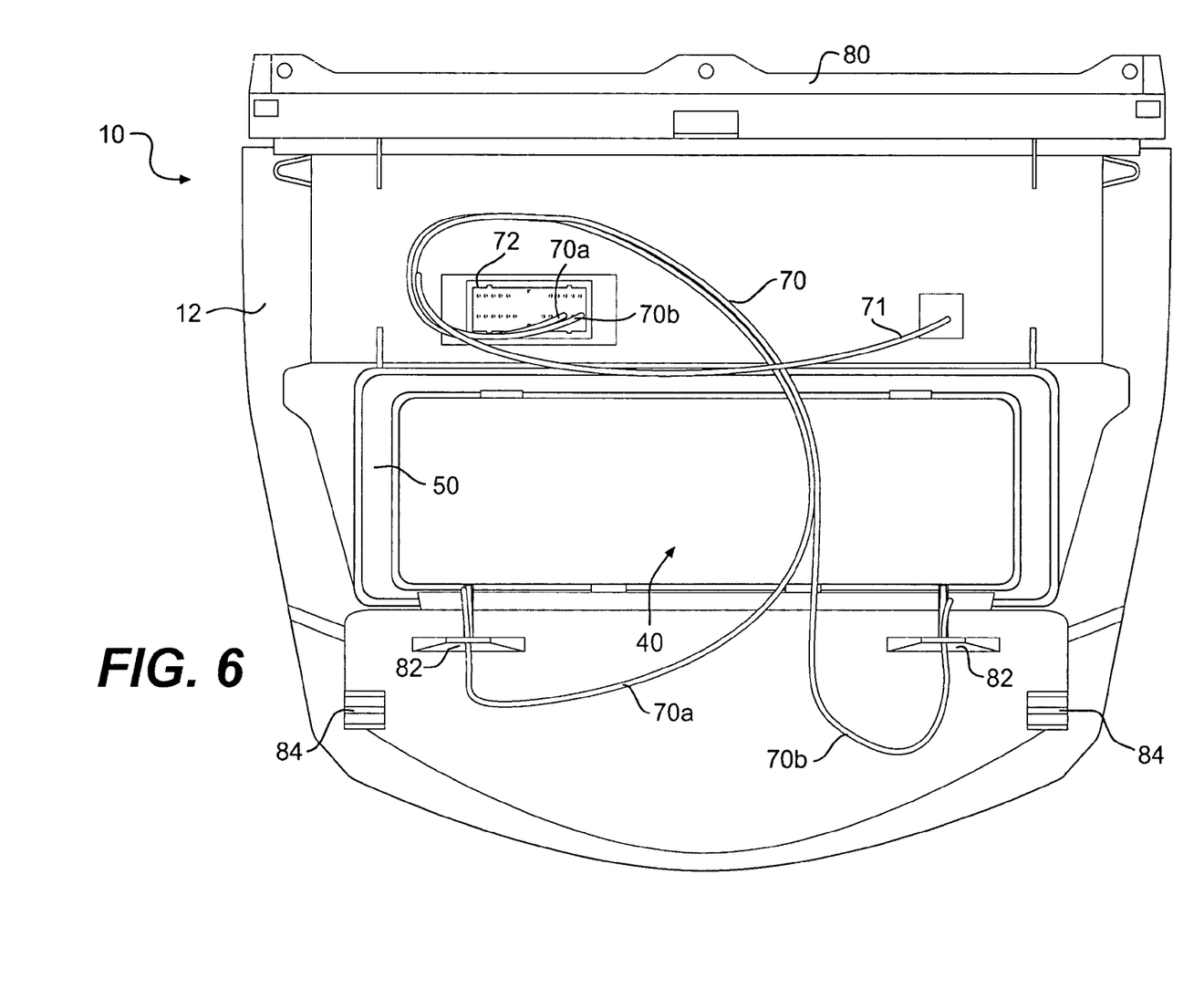
FIG. 6 is a back view of the installation kit shown in FIG. 1.

With reference to FIGS. 6 and 7 in combination, the controller of the installation kit is electrically connected to a vehicle power source (not shown) by wires 70. Power is supplied to the controller 100 and to backlighting L of the installation kit via a voltage regulator V. A positive lead 70a and a negative lead 70b attach at one end to a plug 72 on the back of the panel 12. The other ends of the positive lead 70a and the negative lead 70b are electrically connected to the voltage-regulated power source V and ground, respectively. An auxiliary power lead 71 splits off of positive lead 70a to supply power to the mode selection interface 18 and the associated LEDs.

The embodiments discussed above are representative of preferred embodiments of our invention and are provided for illustrative purposes only. They are not intended to limit the scope of the invention. Although specific structures, dimensions, components, etc., have been shown and described, such are not limiting. Modifications and variations are contemplated within the scope of our invention, which is intended to be limited only by the scope of the accompanying claims. For example, the size, shape, and mounting configuration of the installation kit can be modified depending on the particular vehicle for which it is designed, the size of aftermarket stereo for which it is intended to be used (i.e., single DIN, ISO DIN, 1.5 DIN, or double DIN), or the like.

We claim:

1. An installation kit for adapting a vehicle having an autosound head unit of a non-standard size for installation of a separate after-market autosound head unit having a standardized size and for interfacing with said vehicle's climate control system, said climate control system being configured to receive command inputs commanding actions within said climate control system and being configured to generate status outputs indicating the status of said climate control system, said vehicle including a contoured removable dash portion, the kit comprising:

a panel having a front surface, a back surface, and a standard-sized receptacle for receiving said separate aftermarket autosound head unit, wherein said front surface mimics the size and shape of said contoured removable dash portion of said vehicle;

a user interface on said front surface of said panel by which a user can operate said climate control system;

a controller disposed at said back surface of said panel and adapted to control said climate control system in accordance with user input to said user interface;

wherein said controller, in response to said user input, creates said command inputs commanding action within said climate control system and transmits said command inputs to said climate control system; and wherein said controller, in response to said status outputs indicating said status of said climate control system, regulates the operation of at least a portion of said climate control system.

2. An installation kit according to claim 1, said user interface comprising a fan speed selection interface by which said user can set a desired fan speed of the climate control system, and a temperature selection interface by which the user can set a desired temperature of the climate control system.

3. An installation kit according to claim 2, said user interface comprising a mode selection interface by which a user can select where in the vehicle to direct air from the climate control system.

4. An installation kit according to claim 3, said user interface comprising a plurality of buttons, each representing at least one zone of the vehicle, such that by selecting one of said plurality of buttons the user can cause air to be directed to the at least one zone corresponding to the selected button.

5. An installation kit according to claim 4, said user interface comprising an air conditioning selector by which a user can activate an air conditioning portion of the climate control system of the vehicle.

6. An installation kit according to claim 5, said user interface comprising an air recirculation/fresh selector by which a user can select whether outside air is used as an air source of the climate control system.

7. An installation kit according to claim 6, said user interface comprising a rear window defrost selector by which a user can activate a rear window defroster of the vehicle.

8. An installation kit according to claim 7, further comprising at least one visible indicator associated with each of said mode selection interface, said air conditioning selector, said air recirculation/fresh selector, and said rear window defrost selector, that visibly indicates a current state of the climate control system.

9. An installation kit according to claim 8, each visible indicator comprising a light emitting diode.

10. An installation kit according to claim 7, said controller comprising a microprocessor adapted to control a blower fan, a mode selection motor, an air conditioner compressor, and a rear defroster, in response to operation by the user of said mode selection interface, said air conditioning selector, said air circulation/fresh selector, and said rear window defrost selector, respectively.

11. An installation kit according to claim 1, said user interface comprising a mode selection interface comprising a plurality of buttons, each representing at least one zone of the vehicle.

12. An installation kit according to claim 11, whrein said controller is adapted to control a mode selection motor of a vehicle in its intended use, when one of said plurality of buttons is selected, to direct air to the at least one zone corresponding to the selected button.

13. An installation kit according to claim 1, said user interface comprising an air conditioning selector by which a user can activate an air conditioning portion of the climate control system of the vehicle.

14. An installation kit according to claim 13, wherein said controller is adapted to activate an air conditioning compressor of the vehicle in accordance with operation of said air conditioning selector by the user.

15. An installation kit according to claim 1, said user interface comprising an air circulation/fresh selector by which a user can select whether outside air is used as an air source of the climate control system.

16. An installation kit according to claim 15, wherein said controller is adapted to activate a recirculate/fresh motor of the vehicle in response to operation of said air recirculation/fresh selector by the user.

17. An installation kit according to claim 1, said user interface comprising a rear window defrost selector by which a user can select to derost a rear window of the vehicle.

18. An installation kit according to claim 17, wherein said controller is adapted to activate a rear window defroster of the vehicle in response to operation of said rear window defrost selector by the user.

19. An installation kit according to claim 1, further comprising a visible indicator associated with said user interface that visibly indicates a current state of the climate control system.

20. An installation kit according to claim 19, said visible indicator comprising a light emitting diode.

* * * * *